United States Patent
Ni et al.

(10) Patent No.: US 9,655,109 B2
(45) Date of Patent: May 16, 2017

(54) CHANNEL STATE INFORMATION REFERENCE RESOURCE INDICATION AND MEASUREMENT METHOD AND DEVICE

(71) Applicant: China Academy of Telecommunications Technology, Beijing (CN)

(72) Inventors: Hao Ni, Beijing (CN); Qiubin Gao, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/431,779

(22) PCT Filed: Sep. 27, 2013

(86) PCT No.: PCT/CN2013/084426
§ 371 (c)(1),
(2) Date: Mar. 27, 2015

(87) PCT Pub. No.: WO2014/048363
PCT Pub. Date: Apr. 3, 2014

(65) Prior Publication Data
US 2015/0282165 A1     Oct. 1, 2015

(30) Foreign Application Priority Data

Sep. 28, 2012 (CN) .......................... 2012 1 0370339

(51) Int. Cl.
*H04W 72/04* (2009.01)
*H04L 1/00* (2006.01)
(Continued)

(52) U.S. Cl.
CPC ....... *H04W 72/0446* (2013.01); *H04L 1/0026* (2013.01); *H04L 1/0027* (2013.01);
(Continued)

(58) Field of Classification Search
CPC ... H04L 1/0026; H04L 1/0027; H04L 1/0057; H04L 5/0048; H04L 5/0094;
(Continued)

(56) References Cited

U.S. PATENT DOCUMENTS

| | | | |
|---|---|---|---|
| 2011/0034175 A1* | 2/2011 | Fong | H04B 7/024 455/450 |
| 2013/0028109 A1* | 1/2013 | Jongren | H04W 24/10 370/252 |

FOREIGN PATENT DOCUMENTS

| | | |
|---|---|---|
| CN | 101677261 A | 3/2010 |
| CN | 102595596 A | 7/2012 |

(Continued)

OTHER PUBLICATIONS

Catt: "Remaining issues on CQI definition", 3GPP DRAFT; R1-123215, 3rd Generation Partnership Project (3GPP), Mobile Competence Centre ; 650, Route Des Lucioles ; F-06921 Sophia-Antipolis Cedex ; France vo I. RAN WG1, no. Qingdao, China; 20120813-20120817; Aug. 5, 2012 (Aug. 5, 2012), XP050661107, Retrieved from the Internet:: URL:http://www.3gpp.org/ftp/tsg ran_WG1_RL1/TSGR1_70/Docs/[retrieved on Aug. 5, 2012].

(Continued)

*Primary Examiner* — Stephen J Clawson
(74) *Attorney, Agent, or Firm* — Kilpatrick Townsend & Stockton LLP (57) ABSTRACT

The present application relates to the field of wireless communications. Disclosed are a channel state information (CSI) reference resource indication and measurement method and device, so as to reduce the complexity of measurement and computation performed by a terminal. In the solution provided by the embodiments of the present application, a network side informs a terminal of a periodic value and/or a subframe offset value of a periodic CSI reference resource, and after the periodic value and/or the (Continued)

subframe offset value of the periodic CSI reference resource on a carrier is determined, the terminal determines, through a frame structure type used by the carrier and according to the determined periodic value and/or subframe offset value of the periodic CSI reference resource, a time-frequency resource corresponding to the effective CSI reference resource and measures the CSI in the determined time-frequency resource. It can be seen from the above that, the solution can effectively reduce the complexity of measurement and computation performed by a terminal.

13 Claims, 2 Drawing Sheets

(51) Int. Cl.
    *H04L 5/00*     (2006.01)
    *H04W 24/10*     (2009.01)
    *H04W 68/00*     (2009.01)
    *H04W 88/02*     (2009.01)

(52) U.S. Cl.
    CPC .......... *H04L 1/0057* (2013.01); *H04L 5/0048* (2013.01); *H04W 24/10* (2013.01); *H04W 68/00* (2013.01); *H04W 72/0453* (2013.01); *H04L 5/0094* (2013.01); *H04W 88/02* (2013.01)

(58) Field of Classification Search
    CPC . H04W 24/10; H04W 68/00; H04W 72/0446; H04W 72/0453; H04W 88/02
    USPC ......................................................... 370/329
    See application file for complete search history.

(56) References Cited

FOREIGN PATENT DOCUMENTS

| | | |
|---|---|---|
| CN | 102684835 A | 9/2012 |
| EP | 2852084 A1 | 3/2015 |
| WO | 2011/088034 A1 | 7/2011 |
| WO | 2012/108807 A1 | 8/2012 |

OTHER PUBLICATIONS

The Extended European Search Report issued on Sep. 30, 2015 in the EP counterpart application (13842279.5).
International Search Report for PCT/CN2013/084426.
Office Action for CN 201210370339.1 received May 3, 2015, 11 pages.

* cited by examiner

Fig.1

--Prior Art--

Fig.2

--Prior Art--

Fig.6

CHANNEL STATE INFORMATION REFERENCE RESOURCE INDICATION AND MEASUREMENT METHOD AND DEVICE

The present application claims priority to Chinese Application No. 201210370339.1, filed with the State Intellectual Property Office of China on Sep. 28, 2012, and entitled "CHANNEL STATE INFORMATION REFERENCE RESOURCE INDICATION AND MEASUREMENT METHOD AND DEVICE", the entire contents of which are herein incorporated by reference.

FIELD OF THE DISCLOSURE

The present disclosure relates to the field of wireless communications, and particularly relates to a channel state information reference resource indicating and measuring method and device.

BACKGROUND OF THE DISCLOSURE

In a Long Term Evolution-Advance (LTE-A) system, in order to reduce the adjacent cell interference of User Equipment (UE) at a cell coverage edge and improve the experience of the user equipment at the cell edge, a coordinated multipoint transmission technology is adopted. The coordinated multipoint transmission technology is cooperation among multiple Transmission Points (TPs) separated geographically. In general, the multiple transmission points refer to base stations of different cells or the base station of one cell and multiple Remote Radio Heads (RRHs) controlled by the base station. The coordinated multipoint transmission technology includes downlink coordinated transmission and uplink joint reception. The downlink coordinated multipoint transmission mainly includes two transmission solutions: Coordinated Scheduling/Coordinated Beamforming (CS/CB) and Joint Processing (JP). In CS/CB transmission, one transmission point among the multiple transmission points sends a useful signal to the user equipment, and the other transmission points reduce the interference on the user equipment as much as possible by joint scheduling and beamforming. The joint processing solution includes Joint Transmission (JT) and Dynamic Point Selection (DPS). In JT transmission, the multiple transmission points simultaneously send the useful signal to the user equipment, thus enhancing the receiving signal of the user equipment. In DPS transmission, the transmission points of the user equipment are dynamically switched, and the transmission point optimal to the user equipment is always selected from the coordinated transmission points to transmit a user equipment signal. These coordinated multipoint transmission solutions may be combined for use. A Dynamic Blanking (DB) solution may also be combined to dynamically set certain transmission points to send no signal on certain time-frequency resources.

In order to support coordinated multipoint transmission, the user equipment needs to report the Channel State Information (CSI) of multiple transmission points. A network configures the report of the multipoint channel state information of the user equipment by configuring multiple CSI processes for the user equipment. One CSI process is a combination of a Non-Zero Power (NZP) Channel State Information Reference Signal (referred to as CSI reference signal or CSI-RS for short) resource used for measuring channel information and an Interference Measurement Resource (IMR) used for measuring interference.

The definition of an existing CSI reference resource is as follows:

firstly, on a frequency domain, the CSI reference resource is defined as a group of downlink Physical Resource Blocks (PRBs) corresponding to a frequency band related to a Channel Quality Indicator (CQI) reported by the user equipment; for example, if the CQI reported by the user equipment is a wideband CQI, the frequency domain resource of the CSI reference resource is all PRBs on the entire system bandwidth, if the CQI reported by the user equipment is a sub-band CQI, the frequency domain resource of the CSI reference resource is all PRBs on the sub-band;

secondly, one a time domain, the CSI reference resource is defined as a single downlink subframe $n-n_{CQI\_ref}$, wherein:

n corresponds to a CSI information reporting subframe, for periodic CSI report, $n_{CQI\_ref}$ is a minimum value larger than or equal to 4, and the $n-n_{CQI\_ref}$ corresponds to an effective downlink subframe;

for aperiodic CSI report, $n_{CQI\_ref}$ is a value such that the CSI reference resource and a CSI request, in an uplink Downlink Control Information (DCI) format triggering the aperiodic CSI report, in the same subframe, and the $n-n_{CQI\_ref}$ corresponds to an effective downlink subframe;

for the aperiodic CSI report, $n_{CQI\_ref}$ is equal to 4, the downlink subframe $n-n_{CQI\_ref}$ is an effective downlink subframe, and the user equipment receives the subframe after receiving the CSI request in random access request permission.

The conditions that the downlink subframe in the above-mentioned serving cell is considered as the effective downlink subframe are as follows:

the downlink subframe is a downlink subframe configured for the user equipment; and except a transmission mode 9, the downlink subframe is not a Multimedia Broadcast multicast service Single Frequency Network (MBSFN) subframe; and if the Downlink Pilot Time Slot (DwPTS) length of a particular subframe is 7680·Ts or shorter, the particular subframe is not an effective downlink subframe; and the downlink subframe is not in a measurement gap configured for the user equipment; and for the periodic CSI report, if the user equipment is configured with a CSI subframe set, the downlink subframe is an element in a subframe set related to the periodic CSI report.

If there is no effective downlink subframe for the CSI reference resource in some serving cell, the CSI report of the serving cell in an uplink subframe n is discarded.

Thirdly, on a layer domain, the CSI reference resource is defined by Rank Indication (RI) corresponding to the CQI and a Pre-coding Matrix Indicator (PMI).

Figure 1:
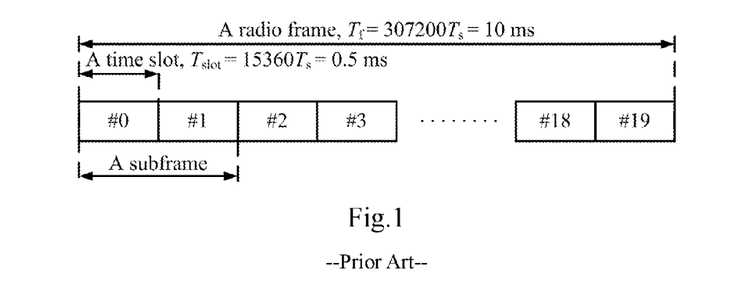
FIG. 1 is a schematic diagram of a frame structure type 1 in the prior art.

The frame structure type of LTE/LTE-A includes a frame structure type 1 and a frame structure type 2. The frame structure type 1 is applied to full duplex and half-duplex Frequency Division Duplex (FDD). The length of each radio frame is $T_f=307200·T_s=10$ ms, 20 time slots are included, the length of each time slot is $T_{slot}=15360·T_s=0.5$ ms, and the time slots are sequentially numbered from 0 to 19. Each subframe includes two continuous time slots $2i$ and $2i+1$. For FDD, within each period of 10 ms, 10 subframes may be applied to downlink transmission, and 10 subframes may be applied to uplink transmission. The uplink and downlink are separated on the frequency domain. FIG. 1 shows a schematic diagram of the frame structure type 1.

Figure 2:
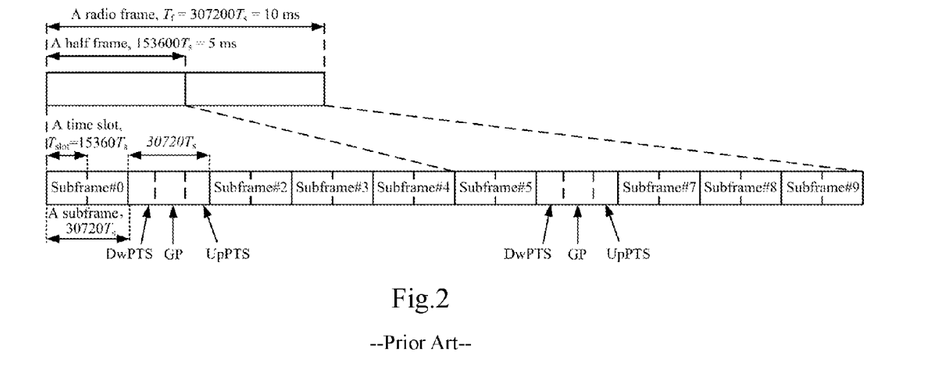
FIG. 2 is a schematic diagram of a frame structure type 2 in the prior art.

The frame structure type 2 is applied to Time Division Duplex (TDD). The length of each radio frame is $T_f=307200 \cdot T_s=10$ ms, 2 half frames are included, and the length of each half frame is $153600 \cdot T_s=5$ ms. Each half frame includes 5 subframes with lengths of $30720 \cdot T_s=1$ ms. The frame structure type 2 supports 6 uplink-downlink configurations, as shown in the following table 1, for each subframe in the radio frame, D represents the subframe is used for downlink transmission, and U represents the subframe is used for uplink transmission, and S represents a particular subframe. One particular subframe includes 3 domains: a DwPTS domain, a Guard Period (GP) domain and an Uplink Pilot Time Slot (UpPTS) domain. Each subframe includes 2 time slots, $2i$ and $2i+1$, and the length of each time slot is: $T_{slot}=15360 \cdot T_s=0.5$ ms. FIG. 2 shows a schematic diagram of the frame structure type 2.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Compared with the traditional single-cell transmission, in the coordinated multipoint transmission, the user equipment needs to report more feedback information. For periodic report, in one carrier, the user equipment needs to perform multiple groups of periodic report; for aperiodic report, the user equipment reports more information upon one trigger. Therefore, the user equipment needs to spend more resources and time to measure and calculate the reported information. Compared with the single-cell transmission, in the coordinated multipoint transmission, in a single carrier, the design that one CSI feedback corresponds to a CSI reference resource will obviously increase the complexity requirements of measurement and calculation of the user equipment.

SUMMARY OF THE DISCLOSURE

Embodiments of the present disclosure provide a channel state information reference resource indicating and measuring method and device, which are used for reducing the complexity requirements of measurement and calculation of a terminal.

A Channel State Information, CSI, reference resource indicating method, including:

determining, by a network side, a periodic value and/or a subframe offset value of a periodic CSI reference resource on a carrier for a terminal;

indicating, by the network side, the determined periodic value and/or subframe offset value of the periodic CSI reference resource to the terminal.

A Channel State Information, CSI, reference resource measurement method, including:

determining, by a terminal, a periodic value and a subframe offset value of a periodic CSI reference resource on a carrier;

determining, by the terminal, a time-frequency resource corresponding to an effective CSI reference resource, according to the frame structure type of the carrier and the determined periodic value and subframe offset value of the periodic CSI reference resource, and measuring the CSI on the determined time-frequency resource.

A base station, including:

a determining component, configured to determine a periodic value and/or a subframe offset value of a periodic CSI reference resource on a carrier for a terminal;

an indicating component, configured to indicate the determined periodic value and/or subframe offset value of the periodic CSI reference resource to the terminal.

A base station, including a processor and a data receiving and transmitting interface, wherein:

the processor is configured to determine a periodic value and/or a subframe offset value of a periodic CSI reference resource on a carrier for a terminal; indicate the determined periodic value and/or subframe offset value of the periodic CSI reference resource to the terminal;

the data receiving and transmitting interface is configured to achieve data communication with the terminal.

A terminal, including:

a first determining component, configured to determine a periodic value and a subframe offset value of a periodic CSI reference resource on a carrier;

a second determining component, configured to determine a time-frequency resource corresponding to an effective CSI reference resource, according to the frame structure type of the carrier and the determined periodic value and subframe offset value of the periodic CSI reference resource;

a measuring component, configured to measure the CSI on the determined time-frequency resource.

A terminal, including a processor and a data receiving and transmitting interface, wherein:

the processor is configured to determine a periodic value and a subframe offset value of a periodic CSI reference resource on a carrier; determine a time-frequency resource corresponding to an effective CSI reference resource, according to the frame structure type of the carrier and the determined periodic value and subframe offset value of the periodic CSI reference resource; measure the CSI on the determined time-frequency resource;

the data receiving and transmitting interface is configured to achieve communication with a network side, in order to determine the periodic value and/or the subframe offset value of the periodic CSI reference resource on the carrier.

In the solutions provided by embodiments of the present disclosure, the network side indicates the periodic value and/or the subframe offset value of the periodic CSI reference resource to the terminal, after determining the periodic value and the subframe offset value of the periodic CSI reference resource on the carrier, the terminal determines the time-frequency resource corresponding to the effective CSI reference resource, according to the frame structure type of the carrier and the determined periodic value and subframe offset value of the periodic CSI reference resource, and measures the CSI on the determined time-frequency resource. Thus it can be seen that, in the solutions, the terminal may determine the time-frequency resource where CSI measurement is performed, according to the periodic value and the subframe offset value of the periodic CSI reference resource, such that the complexity requirements of measurement and calculation of the terminal may be effectively reduced.

DETAILED DESCRIPTION OF THE EMBODIMENTS

An embodiment of the present disclosure provides a CSI reference resource indicating method, so that a terminal may obtain related information of a periodic CSI reference resource from a network side, and determine the position of an effective CSI reference resource where CSI measurement is performed according to the obtained information.

Figure 3:
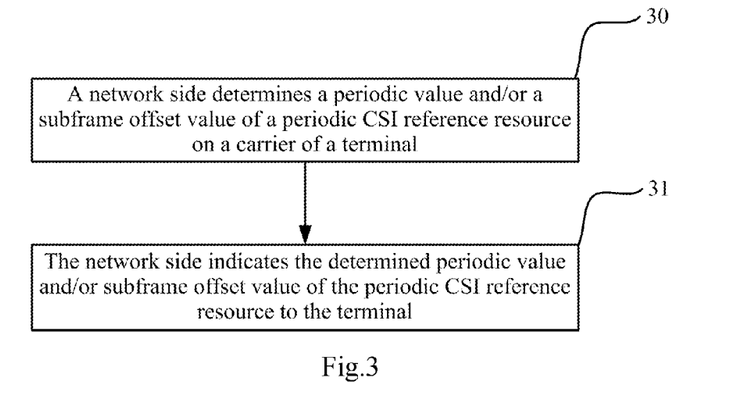
FIG. 3 is a schematic diagram of a flow of a method provided by an embodiment of the present disclosure.

See FIG. 3, the CSI reference resource indicating method provided by the embodiment of the present disclosure for the network side includes the following operations:

operation 30: determining, by the network side, a periodic value and/or a subframe offset value of a periodic CSI reference resource on a carrier for a terminal;

operation 31: indicating, by the network side, the determined periodic value and/or subframe offset value of the periodic CSI reference resource to the terminal.

As a first implementation, in operation 30, determining, by the network side, a periodic value and a subframe offset value of a periodic CSI reference resource on a carrier for a terminal, may be specifically implemented as follows:

determining, by the network side, one periodic value and one subframe offset value of the periodic CSI reference resource for all carriers configured for the terminal;

correspondingly, in operation 31, indicating, by the network side, the determined periodic value and/or subframe offset value of the periodic CSI reference resource to the terminal, may be specifically implemented as follows:

indicating, by the network side, the determined periodic value and subframe offset value to the terminal through high-level signalling.

As a second implementation, in operation 30, determining, by the network side, a periodic value and a subframe offset value of a periodic CSI reference resource on a carrier for a terminal, may be specifically implemented as follows:

respectively determining, by the network side, one periodic value and one subframe offset value of the periodic CSI reference resource for each carrier configured for the terminal;

correspondingly, in operation 31, indicating, by the network side, the determined periodic value and/or subframe offset value of the periodic CSI reference resource to the terminal, may be specifically implemented as follows:

indicating, by the network side, the determined periodic value and subframe offset value corresponding to each carrier to the terminal through high-level signalling.

As a third implementation, in operation 30, determining, by the network side, a periodic value and a subframe offset value of a periodic CSI reference resource on a carrier for a terminal, may be specifically implemented as follows:

determining, by the network side, one subframe offset value of the periodic CSI reference resource for all carriers configured for the terminal;

correspondingly, in operation 31, indicating, by the network side, the determined periodic value and/or subframe offset value of the periodic CSI reference resource to the terminal, may be specifically implemented as follows:

indicating, by the network side, the determined one subframe offset value to the terminal through high-level signalling.

As a fourth implementation manner, in operation 30, determining, by the network side, a periodic value and a subframe offset value of a periodic CSI reference resource on a carrier for a terminal, may be specifically implemented as follows:

respectively determining, by the network side, one subframe offset value of the periodic CSI reference resource for each carrier configured for the terminal;

correspondingly, in operation 31, indicating, by the network side, the determined periodic value and/or subframe offset value of the periodic CSI reference resource to the terminal, may be specifically implemented as follows:

indicating, by the network side, the determined subframe offset value corresponding to each carrier to the terminal through high-level signalling.

In the method, when indicating the periodic value and the subframe offset value of the periodic CSI reference resource to the terminal, the network side may directly send the periodic value and the subframe offset value to the terminal, or send serial numbers corresponding to the periodic value and the subframe offset value to the terminal, and the terminal determines the periodic value and the subframe offset value corresponding to the received serial numbers according to a corresponding relationship, pre-agreed with the network side, between a group of periodic values and subframe offset values and the serial numbers.

In order to reduce the complexity requirements of measurement and calculation of the terminal, an embodiment of the present disclosure provides a CSI measuring method.

Figure 4:
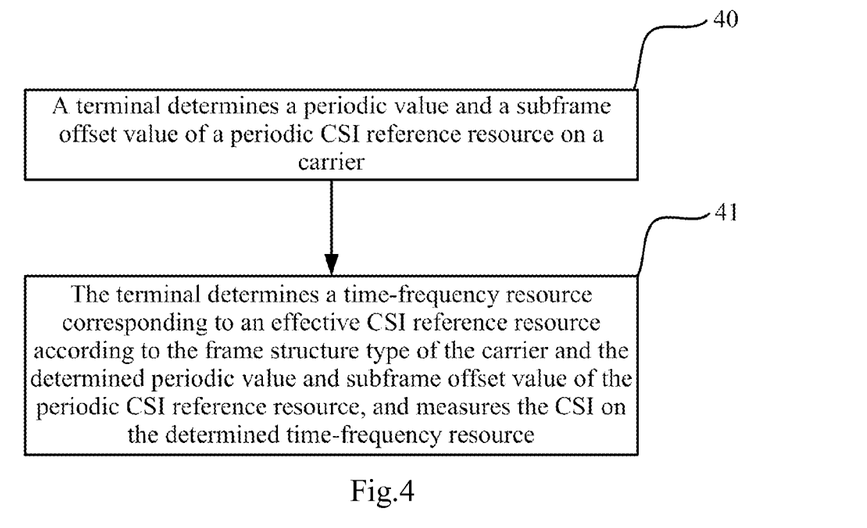
FIG. 4 is a schematic diagram of a flow of another method provided by an embodiment of the present disclosure.

See FIG. 4, the CSI measurement method provided by an embodiment of the present disclosure for a terminal side includes the following operations:

operation 40: determining, by a terminal, a periodic value and a subframe offset value of a periodic CSI reference resource on a carrier;

operation 41: determining, by the terminal, a time-frequency resource corresponding to an effective CSI reference resource according to the frame structure type of the carrier and the determined periodic value and subframe offset value of the periodic CSI reference resource, and measuring the CSI on the determined time-frequency resource.

In operation 40, determining, by a terminal, a periodic value and a subframe offset value of a periodic CSI reference resource on a carrier, may be specifically implemented as follows:

determining, by the terminal, the periodic value and the subframe offset value of the periodic CSI reference resource on the carrier according to the indication of a network side;

or, determining, by the terminal, the subframe offset value of the periodic CSI reference resource on the carrier according to the indication of the network side, and determining the periodic value of the periodic CSI reference resource according to the negotiation with the network side;

or, determining, by the terminal, the periodic value of the periodic CSI reference resource on the carrier according to the indication of the network side, and determining the subframe offset value of the periodic CSI reference resource according to the negotiation with the network side;

or, determining, by the terminal, the periodic value of the periodic CSI reference resource on the carrier according to the negotiation with the network side, and determining the subframe offset value of the periodic CSI reference resource, according to Interference Measurement Resource (IMR) offset or Non-Zero Power Channel State Information Reference Signal (NZP CSI-RS) offset or Zero Power Channel State Information Reference Signal (ZP CSI-RS) offset. For example, the method of determining the subframe offset value of the periodic CSI reference resource according to the IMR offset is as follows: it is set that $T_{CSI\_ref}$ is the periodic value of the periodic CSI reference resource, and $\Delta$IMR is IMR offset, the subframe offset value of the periodic CSI reference resource is $\Delta_{CSI\_ref}=(\Delta IMR) \mod T_{CSI\_ref}$; when determining the subframe offset value of the periodic CSI reference resource according to the NZP CSI-RS offset or the ZP CSI-RS offset, a similar method may also be adopted.

In operation 41, determining, by the terminal, a time-frequency resource corresponding to an effective CSI reference resource, according to the frame structure type of the carrier and the determined periodic CSI value and subframe offset value of the periodic CSI reference resource, may be specifically implemented as follows:

determining, by the terminal, one or multiple expected subframe serial numbers $K_{CSI\_ref}$ corresponding to the periodic value and the subframe offset value of the periodic CSI reference resource, in the frame structure type of the carrier;

for each obtained expected subframe serial number $K_{CSI\_ref}$, determining, by the terminal whether the expected subframe serial number $K_{CSI\_ref}$ satisfies the time domain definition of a CSI reference resource in an LTE system, if the expected subframe serial number $K_{CSI\_ref}$ satisfies the time domain definition of a CSI reference resource in an LTE system, determining a unique subframe corresponding to the expected subframe serial number $K_{CSI\_ref}$ as the time domain resource corresponding to the effective CSI reference resource;

determining, by the terminal, the frequency domain resource corresponding to the effective CSI reference resource, according to the frequency domain definition of the CSI reference resource in the LTE system.

As an implementation manner, determining, by the terminal, one or multiple expected subframe serial numbers $K_{CSI\_ref}$ corresponding to the periodic value and the subframe offset value of the periodic CSI reference resource, in the frame structure type of the carrier, may be specifically implemented as follows:

when the frame structure type of the carrier is the frame structure type 1 defined in the LTE system, obtaining, by the terminal, one or multiple expected subframe serial numbers $K_{CSI\_ref}$ of the periodic CSI reference resource satisfying the following formula 1:

$$(10 \cdot n_f + K_{CSI\_ref} - \Delta_{CSI\_ref}) \mod T_{CSI\_ref} = 0, K_{CSI\_ref} \in \{0,1,\ldots,9\};$$ formula 1:

herein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame.

As a second implementation, determining, by the terminal, one or multiple expected subframe serial numbers $K_{CSI\_ref}$ corresponding to the periodic value and the subframe offset value of the periodic CSI reference resource, in the frame structure type of the carrier, may be specifically implemented as follows:

when the frame structure type of the carrier is the frame structure type 2 defined in the LTE system, obtaining, by the terminal, one or multiple expected time domain serial numbers $D_{CSI\_ref}$ of the periodic CSI reference resource satisfying the following formula 2:

$$(10 \cdot n_f + D_{CSI\_ref} - \Delta_{CSI\_ref}) \mod T_{CSI\_ref} = 0, D_{CSI\_ref} \in \{0,1,\ldots,9\};$$ formula 2:

herein, $T_{CSI\_ref}$ refers to the determined periodic value of the periodic CSI reference resource, $T_{CSI\_ref}$ refers to the determined subframe offset value of the periodic CSI reference resource, and $n_f$ refers to the serial number of a radio frame;

for each obtained expected time domain serial number $D_{CSI\_ref}$, mapping, by the terminal, according to a preset mapping method to obtain an expected subframe serial number $K_{CSI\_ref}$.

For an expected time domain serial number $D_{CSI\_ref}$, mapping, by the terminal, according to a preset mapping method to obtain an expected subframe serial number $K_{CSI\_ref}$, may be specifically implemented as follows:

utilizing, by the terminal, the expected time domain serial number $D_{CSI\_ref}$ as the expected subframe serial number $K_{CSI\_ref}$; or, determining, by the terminal, whether a subframe corresponding to the expected time domain serial number $D_{CSI\_ref}$ is a downlink subframe, or a particular subframe with Downlink Pilot Time Slot (DwPTS) domain length satisfying the time domain condition of the effective CSI reference resource, according to the current uplink-downlink configuration; if the subframe corresponding to the expected time domain serial number $D_{CSI\_ref}$ is a downlink subframe, or a particular subframe with DwPTS domain length satisfying the time domain condition of the effective CSI reference resource, utilizing the expected time domain serial number $D_{CSI\_ref}$ as the expected subframe serial number $K_{CSI\_ref}$; if the subframe corresponding to the expected time domain serial number $D_{CSI\_ref}$ is neither a downlink subframe, nor a particular subframe with DwPTS domain length satisfying the time domain condition of the effective CSI reference resource, utilizing the serial number of the downlink subframe, which is closest to the subframe denoted by the expected time domain serial number $D_{CSI\_ref}$, and is in front of the subframe denoted by the expected time domain serial number $D_{CSI\_ref}$ on timing sequence, under the current uplink-downlink configuration, or utilizing the serial number of the particular subframe with the DwPTS domain length satisfying the time domain condition of the effective CSI reference resource, as the expected subframe serial number $K_{CSI\_ref}$; or, obtaining, by the terminal, an expected subframe serial number $K_{CSI\_ref}$ according to a mapping relationship between the expected time domain serial number and the expected subframe serial number of the periodic CSI reference resource pre-agreed with the network side.

As a third implementation, determining, by the terminal, one or multiple expected subframe serial numbers $K_{CSI\_ref}$ corresponding to the periodic value and the subframe offset value of the periodic CSI reference resource, in the frame structure type of the carrier, may be specifically implemented as follows:

when the frame structure type of the carrier is the frame structure type 2 defined in the LTE system, obtaining, by the terminal, one or multiple expected subframe serial numbers $K_{CSI\_ref}$ of the periodic CSI reference resource satisfying the following formula 3:

$$(10 \cdot n_f + K_{CSI\_ref} - \Delta_{CSI\_ref} + \Lambda(\Delta_{CSI\_ref})) \mod T_{CSI\_ref} = 0, K_{CSI\_ref} \in \{0,1,\ldots,9\};$$ formula 3:

herein, $T_{CSI\_ref}$ refers to the determined periodic value of the periodic CSI reference resource, $\Delta_{CSI\_ref}$ refers to the determined subframe offset value of the periodic CSI reference resource, $n_f$ refers to the serial number of a radio frame, $\Lambda(\Delta_{CSI\_ref})$ refers to a subframe offset correction value of $\Delta_{CSI\_ref}$, the terminal obtains the $\Lambda(\Delta_{CSI\_ref})$ corresponding to the $\Delta_{CSI\_ref}$ according to a mapping relationship between the subframe offset value and the subframe offset correction value under the current uplink-downlink configuration pre-agreed with the network side.

As a fourth implementation manner, determining, by the terminal, one or multiple expected subframe serial numbers $K_{CSI\_ref}$ corresponding to the periodic value and the subframe offset value of the periodic CSI reference resource, in the frame structure type of the carrier, may be specifically implemented as follows:

when the frame structure type of the carrier is the frame structure type 2 defined in the LTE system, obtaining, by the terminal, one or multiple expected subframe serial numbers $K_{CSI\_ref}$, corresponding to the subframe offset value of the periodic CSI reference resource, according to a mapping relationship between the subframe offset value and the expected subframe serial number under the current uplink-downlink configuration pre-agreed with the network side.

The present disclosure will be illustrated below in detail in combination with specific embodiments:

a configuration embodiment of the periodic value and the subframe offset value of the periodic CSI reference resource under one FDD is shown in the following table 2:

TABLE 2

| Periodic value and subframe offset value configuration serial number (ICSI_ref) | Periodic value $T_{CSI\_ref}$ (ms) | Subframe offset value $\Delta_{CSI\_ref}$ |
|---|---|---|
| 0-1 | 2 | ICSI_ref |
| 2-6 | 5 | ICSI_ref-2 |

TABLE 2-continued

| Periodic value and subframe offset value configuration serial number (ICSI_ref) | Periodic value $T_{CSI\_ref}$ (ms) | Subframe offset value $\Delta_{CSI\_ref}$ |
|---|---|---|
| 7-16 | 10 | ICSI_ref-7 |
| 17-36 | 20 | ICSI_ref-17 |
| 37-76 | 40 | ICSI_ref-37 |

A configuration embodiment of the periodic value and the subframe offset value of the periodic CSI reference resource under one TDD is shown in the following table 3:

TABLE 3

| Periodic value and subframe offset value configuration serial number (ICSI_ref) | Periodic value $T_{CSI\_ref}$ (ms) | Subframe offset value $\Delta_{CSI\_ref}$ |
|---|---|---|
| 0 | 1 | ICSI_ref |
| 1-5 | 5 | ICSI_ref-1 |
| 6-15 | 10 | ICSI_ref-6 |
| 16-35 | 20 | ICSI_ref-16 |
| 36-75 | 40 | ICSI_ref-36 |

Embodiment 1 of a mapping relationship between the expected time domain serial number of the periodic CSI reference resource and the expected subframe serial number of the periodic CSI reference resource under the TDD:

when the periodic value of the CSI reference resource is $T_{CSI\_ref}=5$ ms, the user equipment obtains the expected subframe serial number $K_{CSI\_ref}$ of the periodic CSI reference resource by mapping from the following table 4, according to the obtained expected time domain serial number $D_{CSI\_ref}$:

TABLE 4

| Time domain serial number | DwPTS length | Expected subframe serial number $K_{CSI\_ref}$ of periodic CSI reference resource | | | | | | | | | |
|---|---|---|---|---|---|---|---|---|---|---|---|
| | | 0 | 1 | 2 | 3 | 4 | 5 | 6 | 7 | 8 | 9 |
| $D_{CSI\_ref}$ under uplink-downlink configuration 0 | larger than 7680 · Ts | 0, 2, 3, 4 | 1 | | | | 5, 7, 8, 9 | 6 | | | |
| | smaller than or equal to 7680 · Ts | 0, 1, 2, 3, 4 | | | | | 5, 6, 7, 8, 9 | | | | |
| $D_{CSI\_ref}$ under uplink-downlink configuration 1 | larger than 7680 · Ts; | 0, 2, 3 | 1 | | | 4 | 5, 7, 8 | 6 | | | 9 |
| | smaller than or equal to 7680 · Ts | 0, 1, 2, 3 | | | | 4 | 5, 6, 7, 8 | | | | 9 |
| $D_{CSI\_ref}$ under uplink-downlink configuration 2 | larger than 7680 · Ts | 0, 2 | 1 | | 3 | 4 | 5, 7 | 6 | | 8 | 9 |
| | smaller than or equal to 7680 · Ts | 0, 1, 2 | | | 3 | 4 | 5, 6, 7 | | | 8 | 9 |
| $D_{CSI\_ref}$ under uplink-downlink configuration 3 | larger than 7680 · Ts | 0, 2, 3 | 1 | | | | 4, 5 | 6 | 7 | 8 | 9 |
| | smaller than or equal to 7680 · Ts | 0, 1, 2, 3 | | | | | 4, 5, 6 | | 7 | 8 | 9 |
| $D_{CSI\_ref}$ under uplink-downlink configuration 4 | larger than 7680 · Ts | 0, 2, 3 | 1 | | | 4 | 5 | 6 | 7 | 8 | 9 |
| | smaller than or equal to 7680 · Ts | 0, 1, 2, 3 | | | | 4 | 5, 6 | | 7 | 8 | 9 |

TABLE 4-continued

| Time domain | | Expected subframe serial number $K_{CSI\_ref}$ of periodic CSI reference resource | | | | | | | | | |
|---|---|---|---|---|---|---|---|---|---|---|---|
| serial number | DwPTS length | 0 | 1 | 2 | 3 | 4 | 5 | 6 | 7 | 8 | 9 |
| $D_{CSI\_ref}$ under uplink-downlink configuration 5 | larger than 7680 · Ts | 0, 2 | 1 | | 3 | 4 | 5 | 6 | 7 | 8 | 9 |
| | smaller than or equal to 7680 · Ts | 0, 2, 1 | | | 3 | 4 | 5, 6 | | 7 | 8 | 9 |
| $D_{CSI\_ref}$ under uplink-downlink configuration 6 | larger than 7680 · Ts | 0, 2, 3, 4 | 1 | | | | 5, 7, 8 | 6 | | | 9 |
| | smaller than or equal to 7680 · Ts | 0, 1, 2, 3, 4 | | | | | 5, 6, 7, 8 | | | | 9 |

Embodiment 2 of the mapping relationship between the expected time domain serial number of the periodic CSI reference resource and the expected subframe serial number of the periodic CSI reference resource under the TDD:

when the periodic value of the CSI reference resource is $T_{CSI\_ref}$=5 ms, the user equipment obtains the expected subframe serial number $K_{CSI\_ref}$ of the periodic CSI reference resource by mapping from the following table 5, according to the obtained expected time domain serial number $D_{CSI\_ref}$:

Embodiment 3 of the mapping relationship between the expected time domain serial number of the periodic CSI reference resource and the expected subframe serial number of the periodic CSI reference resource under the TDD:

when the periodic value of the CSI reference resource is $T_{CSI\_ref}$=5 ms, the user equipment obtains the expected subframe serial number $K_{CSI\_ref}$ of the periodic CSI reference resource by mapping from the following table 6, according to the obtained expected time domain serial number $D_{CSI\_ref}$:

TABLE 5

| Time domain | | Expected subframe serial number $K_{CSI\_ref}$ of periodic CSI reference resource | | | | | | | | | |
|---|---|---|---|---|---|---|---|---|---|---|---|
| serial number | DwPTS length | 0 | 1 | 2 | 3 | 4 | 5 | 6 | 7 | 8 | 9 |
| $D_{CSI\_ref}$ under uplink-downlink configuration 0 | larger than 7680 · Ts | 0, 2, 8, 9 | 1 | | | | 3, 4, 5, 7 | 6 | | | |
| | smaller than or equal to 7680 · Ts | 0, 1, 2, 8, 9 | | | | | 3, 4, 5, 6, 7 | | | | |
| $D_{CSI\_ref}$ under uplink-downlink configuration 1 | Larger than 7680 · Ts | 0, 2 | 1 | | | 3, 4 | 5, 7 | 6 | | | 8, 9 |
| | smaller than or equal to 7680 · Ts | 0, 1, 2 | | | | 3, 4 | 5, 6, 7 | | | | 8, 9 |
| $D_{CSI\_ref}$ under uplink-downlink configuration 2 | larger than 7680 · Ts | 0 | 1 | 2, 3 | | 4 | 5 | 6 | | 7, 8 | 9 |
| | smaller than or equal to 7680 · Ts | 0, 1 | | 2, 3 | | 4 | 5, 6 | | | 7, 8 | 9 |
| $D_{CSI\_ref}$ under uplink-downlink configuration 3 | larger than 7680 · Ts | 0, 2 | 1 | | | | 3, 4, 5 | 6 | 7 | 8 | 9 |
| | smaller than or equal to 7680 · Ts | 0, 1, 2 | | | | | 3, 4, 5, 6 | | 7 | 8 | 9 |
| $D_{CSI\_ref}$ under uplink-downlink configuration 4 | larger than 7680 · Ts | 0, 2 | 1 | | | 3, 4 | 5 | 6 | 7 | 8 | 9 |
| | smaller than or equal to 7680 · Ts | 0, 1, 2 | | | | 3, 4 | 5, 6 | | 7 | 8 | 9 |
| $D_{CSI\_ref}$ under uplink-downlink configuration 5 | larger than 7680 · Ts | 0 | 1 | 2, 3 | | 4 | 5 | 6 | 7 | 8 | 9 |
| | smaller than or equal to 7680 · Ts | 0, 1 | | 2, 3 | | 4 | 5, 6 | | 7 | 8 | 9 |
| $D_{CSI\_ref}$ under uplink-downlink configuration 6 | larger than 7680 · Ts | 0, 2 | 1 | | | | 3, 4, 5, 7 | 6 | | | 8, 9 |
| | smaller than or equal to 7680 · Ts | 0, 1, 2 | | | | | 3, 4, 5, 6, 7 | | | | 8, 9 |

TABLE 6

| Time domain serial number | DwPTS length | Subframe serial number $K_{CSI\_ref}$ of expected periodic CSI reference resource | | | | | | | | | |
|---|---|---|---|---|---|---|---|---|---|---|---|
| | | 0 | 1 | 2 | 3 | 4 | 5 | 6 | 7 | 8 | 9 |
| $D_{CSI\_ref}$ under uplink-downlink configuration 0 | Larger than 7680 · Ts | 0, 2, 8, 9 | 1 | | | | 3, 4, 5, 7 | 6 | | | |
| | Smaller than or equal to 7680 · Ts | 0, 1, 2, 8, 9 | | | | | 3, 4, 5, 6, 7 | | | | |
| $D_{CSI\_ref}$ under uplink-downlink configuration 1 | Larger than 7680 · Ts | 0, 2 | 1 | | | 3, 4 | 5, 7 | 6 | | 8, 9 | |
| | Smaller than or equal to 7680 · Ts | 0, 1, 2 | | | | 3, 4 | 5, 6, 7 | | | 8, 9 | |
| $D_{CSI\_ref}$ under uplink-downlink configuration 2 | Larger than 7680 · Ts | 0 | 1 | 2, 3 | | 4 | 5 | 6 | 7, 8 | | 9 |
| | Smaller than or equal to 7680 · Ts | 0, 1 | | 2, 3 | | 4 | 5, 6 | | 7, 8 | | 9 |
| $D_{CSI\_ref}$ under uplink-downlink configuration 3 | Larger than 7680 · Ts | 0, 2, 3, 4 | 1 | | | | 5, 7, 8, 9 | 6 | | | |
| | Smaller than or equal to 7680 · Ts | 0, 1, 2, 3, 4 | | | | | 5, 6, 7, 8, 9 | | | | |
| $D_{CSI\_ref}$ under uplink-downlink configuration 4 | Larger than 7680 · Ts | 0, 2 | 1 | | | 3, 4 | 5, 7 | 6 | | 8, 9 | |
| | Smaller than or equal to 7680 · Ts | 0, 1, 2 | | | | 3, 4 | 5, 6, 7 | | | 8, 9 | |
| $D_{CSI\_ref}$ under uplink-downlink configuration 5 | Larger than 7680 · Ts | 0 | 1 | 2, 3 | | 4 | 5 | 6 | 7, 8 | | 9 |
| | Smaller than or equal to 7680 · Ts | 0, 1 | | 2, 3 | | 4 | 5, 6 | | 7, 8 | | 9 |
| $D_{CSI\_ref}$ under uplink-downlink configuration 6 | Larger than 7680 · Ts | 0, 2, 8, 9 | 1 | | | | 3, 4, 5, 7 | 6 | | | |
| | Smaller than or equal to 7680 · Ts | 0, 1, 2, 8, 9 | | | | | 3, 4, 5, 6, 7 | | | | |

Embodiment 4 of the mapping relationship between the expected time domain serial number of the periodic CSI reference resource and the expected subframe serial number of the periodic CSI reference resource under the TDD: when the periodic value of the CSI reference resource is $T_{CSI\_ref}=5$ ms, the user equipment obtain the expected subframe serial number $K_{CSI\_ref}$ of the periodic CSI reference resource by mapping from the following table 7, according to the obtained expected time domain serial number DCSI_ref:

TABLE 7

| Time domain serial number | DwPTS length | Subframe serial number KCSI_ref of expected periodic CSI reference resource | | | | | | | | | |
|---|---|---|---|---|---|---|---|---|---|---|---|
| | | 0 | 1 | 2 | 3 | 4 | 5 | 6 | 7 | 8 | 9 |
| $D_{CSI\_ref}$ under uplink-downlink configuration 0 | Larger than 7680 · Ts | 0, 7, 8, 9 | 1 | | | | 2, 3, 4, 5 | 6 | | | |
| | Smaller than or equal to 7680 · Ts | 0, 1, 7, 8, 9 | | | | | 2, 3, 4, 5, 6 | | | | |
| $D_{CSI\_ref}$ under uplink-downlink configuration 1 | Larger than 7680 · Ts | 0 | 1 | | 2, 3, 4 | | 5 | 6 | | 7, 8, 9 | |
| | Smaller than or equal to 7680 · Ts | 0, 1 | | | 2, 3, 4 | | 5, 6 | | | 7, 8, 9 | |
| $D_{CSI\_ref}$ under uplink-downlink configuration 2 | Larger than 7680 · Ts | 0 | 1 | 2, 3 | | 4 | 5 | 6 | 7, 8 | | 9 |
| | Smaller than or equal to 7680 · Ts | 0, 1 | | 2, 3 | | 4 | 5, 6 | | 7, 8 | | 9 |
| $D_{CSI\_ref}$ under uplink-downlink configuration 3 | Larger than 7680 · Ts | 0, 7, 8, 9 | 1 | | | | 2, 3, 4, 5 | 6 | | | |
| | Smaller than or equal to 7680 · Ts | 0, 1, 7, 8, 9 | | | | | 2, 3, 4, 5, 6 | | | | |

TABLE 7-continued

| Time domain serial number | DwPTS length | Subframe serial number KCSI_ref of expected periodic CSI reference resource | | | | | | | | | |
|---|---|---|---|---|---|---|---|---|---|---|---|
| | | 0 | 1 | 2 | 3 | 4 | 5 | 6 | 7 | 8 | 9 |
| $D_{CSI\_ref}$ under uplink-downlink configuration 4 | Larger than $7680 \cdot Ts$ | 0 | 1 | | 2, 3, 4 | | 5 | 6 | | 7, 8, 9 | |
| | Smaller than or equal to $7680 \cdot Ts$ | 0, 1 | | | 2, 3, 4 | | 5, 6 | | | 7, 8, 9 | |
| $D_{CSI\_ref}$ under uplink-downlink configuration 5 | Larger than $7680 \cdot Ts$ | 0 | 1 | 2, 3 | | 4 | 5 | 6 | 7, 8 | | 9 |
| | Smaller than or equal to $7680 \cdot Ts$ | 0, 1 | | 2, 3 | | 4 | 5, 6 | | 7, 8 | | 9 |
| $D_{CSI\_ref}$ under uplink-downlink configuration 6 | Larger than $7680 \cdot Ts$ | 0, 7, 8, 9 | 1 | | | | 2, 3, 4, 5 | 6 | | | |
| | Smaller than or equal to $7680 \cdot Ts$ | 0, 1, 7, 8, 9 | | | | | 2, 3, 4, 5, 6 | | | | |

Embodiment 1 of the mapping relationship between the subframe offset value and the subframe offset correction value of different uplink-downlink configurations under the TDD:

when the periodic value of the CSI reference resource is $T_{CSI\_ref}=5$ ms, the user equipment obtains the subframe offset correction value $\Lambda(\Delta_{CSI\_ref})$ through the mapping relationship, pre-agreed with the network, as shown in the following table 8, according to the subframe offset value $\Delta_{CSI\_ref}$:

TABLE 8

| Subframe offset correction value $\Lambda (\Delta_{CSI\_ref})$ | DwPTS length | Subframe offset value $\Delta$CSI_ref | | | | |
|---|---|---|---|---|---|---|
| | | 0 | 1 | 2 | 3 | 4 |
| $\Lambda (\Delta_{CSI\_ref})$ under uplink-downlink configuration 0 | Larger than $7680 \cdot Ts$ | 0 | 0 | 2 | −2 | −1 |
| | Smaller than or equal to $7680 \cdot Ts$ | 0 | 1 | 2 | −2 | −1 |
| $\Lambda (\Delta_{CSI\_ref})$ under uplink-downlink configuration 1 | Larger than $7680 \cdot Ts$ | 0 | 0 | 2 | −1 | 0 |
| | Smaller than or equal to $7680 \cdot Ts$ | 0 | 1 | 2 | −1 | 0 |
| $\Lambda (\Delta_{CSI\_ref})$ under uplink-downlink configuration 2 | Larger than $7680 \cdot Ts$ | 0 | 0 | −1 | 0 | 0 |
| | Smaller than or equal to $7680 \cdot Ts$ | 0 | 1 | −1 | 0 | 0 |
| $\Lambda (\Delta_{CSI\_ref})$ under uplink-downlink configuration 3 | Larger than $7680 \cdot Ts$ | 0 | 0 | 2 | 3 | 4 |
| | Smaller than or equal to $7680 \cdot Ts$ | 0 | 1 | 2 | 3 | 4 |
| $\Lambda (\Delta_{CSI\_ref})$ under uplink-downlink configuration 4 | Larger than $7680 \cdot Ts$ | 0 | 0 | 2 | −1 | 0 |
| | Smaller than or equal to $7680 \cdot Ts$ | 0 | 1 | 2 | −1 | 0 |
| $\Lambda (\Delta_{CSI\_ref})$ under uplink-downlink configuration 5 | Larger than $7680 \cdot Ts$ | 0 | 0 | −1 | 0 | 0 |
| | Smaller than or equal to $7680 \cdot Ts$ | 0 | 1 | −1 | 0 | 0 |
| $\Lambda (\Delta_{CSI\_ref})$ under uplink-downlink configuration 6 | Larger than $7680 \cdot Ts$ | 0 | 0 | 2 | −2 | −1 |
| | Smaller than or equal to $7680 \cdot Ts$ | 0 | 1 | 2 | −2 | −1 |

Embodiment 2 of the mapping relationship between the subframe offset value and the subframe offset correction value of different uplink-downlink configurations under the TDD:

when the periodic value of the CSI reference resource is $T_{CSI\_ref}=5$ ms, the user equipment obtains the subframe offset correction value $\Lambda(\Delta_{CSI\_ref})$ through the mapping relationship, pre-agreed with the network, as shown in table 9, according to the subframe offset value $\Delta$CSI_ref:

TABLE 9

| Subframe offset correction value $\Lambda (\Delta_{CSI\_ref})$ | DwPTS length | Subframe offset value $\Delta$CSI_ref | | | | |
|---|---|---|---|---|---|---|
| | | 0 | 1 | 2 | 3 | 4 |
| $\Lambda (\Delta_{CSI\_ref})$ under uplink-downlink configuration 0 | Larger than $7680 \cdot Ts$ | 0 | 0 | −3 | −2 | −1 |
| | Smaller than or equal to $7680 \cdot Ts$ | 0 | 1 | −3 | −2 | −1 |
| $\Lambda (\Delta_{CSI\_ref})$ under uplink-downlink configuration 1 | Larger than $7680 \cdot Ts$ | 0 | 0 | −2 | −1 | 0 |
| | Smaller than or equal to $7680 \cdot Ts$ | 0 | 1 | −2 | −1 | 0 |
| $\Lambda (\Delta_{CSI\_ref})$ under uplink-downlink configuration 2 | Larger than $7680 \cdot Ts$ | 0 | 0 | −1 | 0 | 0 |
| | Smaller than or equal to $7680 \cdot Ts$ | 0 | 1 | −1 | 0 | 0 |
| $\Lambda (\Delta_{CSI\_ref})$ under uplink-downlink configuration 3 | Larger than $7680 \cdot Ts$ | 0 | 0 | −3 | −2 | −1 |
| | Smaller than or equal to $7680 \cdot Ts$ | 0 | 1 | −3 | −2 | −1 |
| $\Lambda (\Delta_{CSI\_ref})$ under uplink-downlink configuration 4 | Larger than $7680 \cdot Ts$ | 0 | 0 | −2 | −1 | 0 |
| | Smaller than or equal to $7680 \cdot Ts$ | 0 | 1 | −2 | −1 | 0 |
| $\Lambda (\Delta_{CSI\_ref})$ under uplink-downlink configuration 5 | Larger than $7680 \cdot Ts$ | 0 | 0 | −1 | 0 | 0 |
| | Smaller than or equal to $7680 \cdot Ts$ | 0 | 1 | −1 | 0 | 0 |
| $\Lambda (\Delta_{CSI\_ref})$ under uplink-downlink configuration 6 | Larger than $7680 \cdot Ts$ | 0 | 0 | −3 | −2 | −1 |
| | Smaller than or equal to $7680 \cdot Ts$ | 0 | 1 | −3 | −2 | −1 |

Embodiment 1 of the mapping relationship between the subframe offset value of different uplink-downlink configurations and the expected subframe serial number of the periodic CSI reference resource under the TDD:

when the periodic value of the CSI reference resource is $T_{CSI\_ref}=5$ ms, the user equipment obtains the expected subframe serial number $\Delta_{CSI\_ref}$ of the periodic CSI reference resource through the mapping relationship, pre-agreed with the network, as shown in table 10, according to the subframe offset value $\Delta_{CSI\_ref}$:

TABLE 10

| Expected subframe serial number $K_{CSI\_ref}$ of periodic CSI reference resource | DwPTS length | Subframe offset value $\Delta_{CSI\_ref}$ | | | | |
|---|---|---|---|---|---|---|
| | | 0 | 1 | 2 | 3 | 4 |
| $K_{CSI\_ref}$ under uplink-downlink configuration 0 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 1 | Larger than 7680 · Ts | 0.5 | 1.6 | 0.5 | 0.5 | 4.9 |
| | Smaller than or equal to 7680 · Ts | 0.5 | 0.5 | 0.5 | 0.5 | 4.9 |
| $K_{CSI\_ref}$ under uplink-downlink configuration 2 | Larger than 7680 · Ts | 0.5 | 1.6 | 0.5 | 3.8 | 4.9 |
| | Smaller than or equal to 7680 · Ts | 0.5 | 0.5 | 0.5 | 3.8 | 4.9 |
| $K_{CSI\_ref}$ under uplink-downlink configuration 3 | Larger than 7680 · Ts | 0.5 | 1.6 | 7.0 | 8.0 | 9.5 |
| | Smaller than or equal to 7680 · Ts | 0.5 | 0.5 | 7.0 | 8.0 | 9.5 |
| $K_{CSI\_ref}$ under uplink-downlink configuration 4 | Larger than 7680 · Ts | 0.5 | 1.6 | 7.0 | 8.0 | 4.9 |
| | Smaller than or equal to 7680 · Ts | 0.5 | 0.5 | 7.0 | 8.0 | 4.9 |
| $K_{CSI\_ref}$ under uplink-downlink configuration 5 | Larger than 7680 · Ts | 0.5 | 1.6 | 7.0 | 3.8 | 4.9 |
| | Smaller than or equal to 7680 · Ts | 0.5 | 0.5 | 7.0 | 3.8 | 4.9 |
| $K_{CSI\_ref}$ under uplink-downlink configuration 6 | Larger than 7680 · Ts | 0.5 | 1.6 | 0.5 | 0.5 | 9.0 |
| | Smaller than or equal to 7680 · Ts | 0.5 | 0.5 | 0.5 | 0.5 | 9.0 |

Embodiment 2 of the mapping relationship between the subframe offset value of different uplink-downlink configurations and the expected subframe serial number of the periodic CSI reference resource under the TDD:

when the periodic value of the CSI reference resource is $T_{CSI\_ref}=5$ ms, the user equipment obtains the expected subframe serial number $K_{CSI\_ref}$ of the periodic CSI reference resource through the mapping relationship, pre-agreed with the network, as shown in table 11, according to the subframe offset value $\Delta_{CSI\_ref}$:

Embodiment 3 of the mapping relationship between the subframe offset value of different uplink-downlink configurations and the expected subframe serial number of the periodic CSI reference resource under the TDD:

when the periodic value of the CSI reference resource is $T_{CSI\_ref}=5$ ms, the user equipment obtains the expected subframe serial number $K_{CSI\_ref}$ of the periodic CSI reference resource through the mapping relationship, pre-agreed with the network, as shown in table 12, according to the subframe offset value $\Delta$CSI_ref:

TABLE 11

| Expected subframe serial number $K_{CSI\_ref}$ of periodic CSI reference resource | DwPTS length | Subframe offset $\Delta_{CSI\_ref}$ | | | | |
|---|---|---|---|---|---|---|
| | | 0 | 1 | 2 | 3 | 4 |
| $K_{CSI\_ref}$ under uplink-downlink configuration 0 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 1 | Larger than 7680 · Ts | 0.5 | 1.6 | 0.5 | 4.9 | 4.9 |
| | Smaller than or equal to 7680 · Ts; | 0.5 | 0.5 | 0.5 | 4.9 | 4.9 |
| $K_{CSI\_ref}$ under uplink-downlink configuration 2 | Larger than 7680 · Ts | 0.5 | 1.6 | 3.8 | 3.8 | 4.9 |
| | Smaller than or equal to 7680 · Ts | 0.5 | 0.5 | 3.8 | 3.8 | 4.9 |
| $K_{CSI\_ref}$ under uplink-downlink configuration 3 | Larger than 7680 · Ts | 0.5 | 1.6 | 7.0 | 8.5 | 9.5 |
| | Smaller than or equal to 7680 · Ts | 0.5 | 0.5 | 7.0 | 8.5 | 9.5 |
| $K_{CSI\_ref}$ under uplink-downlink configuration 4 | Larger than 7680 · Ts | 0.5 | 1.6 | 7.0 | 8.4 | 4.9 |
| | Smaller than or equal to 7680 · Ts | 0.5 | 0.5 | 7.0 | 8.4 | 4.9 |
| $K_{CSI\_ref}$ under uplink-downlink configuration 5 | Larger than 7680 · Ts | 0.5 | 1.6 | 7.3 | 3.8 | 4.9 |
| | Smaller than or equal to 7680 · Ts | 0.5 | 0.5 | 7.3 | 3.8 | 4.9 |
| $K_{CSI\_ref}$ under uplink-downlink configuration 6 | Larger than 7680 · Ts | 0.5 | 1.6 | 0.5 | 5.9 | 5.9 |
| | Smaller than or equal to 7680 · Ts | 0.5 | 0.5 | 0.5 | 5.9 | 5.9 |

TABLE 12

| Expected subframe serial number $K_{CSI\_ref}$ of periodic CSI reference resource | DwPTS length | Subframe offset $\Delta_{CSI\_ref}$ | | | | |
|---|---|---|---|---|---|---|
| | | 0 | 1 | 2 | 3 | 4 |
| $K_{CSI\_ref}$ under uplink-downlink configuration 0 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 1 | Larger than 7680 · Ts | 0.5 | 1.6 | 0.5 | 4.9 | 4.9 |
| | Smaller than or equal to 7680 · Ts | 0.5 | 0.5 | 0.5 | 4.9 | 4.9 |
| $K_{CSI\_ref}$ under uplink-downlink configuration 2 | Larger than 7680 · Ts | 0.5 | 1.6 | 3.8 | 3.8 | 4.9 |
| | Smaller than or equal to 7680 · Ts | 0.5 | 0.5 | 3.8 | 3.8 | 4.9 |
| $K_{CSI\_ref}$ under uplink-downlink configuration 3 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 4 | Larger than 7680 · Ts | 0.5 | 1.6 | 0.5 | 4.9 | 4.9 |
| | Smaller than or equal to 7680 · Ts | 0.5 | 0.5 | 0.5 | 4.9 | 4.9 |
| $K_{CSI\_ref}$ under uplink-downlink configuration 5 | Larger than 7680 · Ts | 0.5 | 1.6 | 3.8 | 3.8 | 4.9 |
| | Smaller than or equal to 7680 · Ts | 0.5 | 0.5 | 3.8 | 3.8 | 4.9 |
| $K_{CSI\_ref}$ under uplink-downlink configuration 6 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |

Embodiment 4 of the mapping relationship between the subframe offset value of different uplink-downlink configurations and the expected subframe serial number of the periodic CSI reference resource under the TDD:

when the periodic value of the CSI reference resource is $T_{CSI\_ref}=5$ ms, the user equipment obtains the expected subframe serial number $K_{CSI\_ref}$ of the periodic CSI reference resource through the mapping relationship, pre-agreed with the network, as shown in table 13, according to the subframe offset value $\Delta_{CSI\_ref}$:

TABLE 13

| Expected subframe serial number $K_{CSI\_ref}$ of periodic CSI reference resource | DwPTS length | Subframe offset $\Delta_{CSI\_ref}$ | | | | |
|---|---|---|---|---|---|---|
| | | 0 | 1 | 2 | 3 | 4 |
| $K_{CSI\_ref}$ under uplink-downlink configuration 0 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 1 | Larger than 7680 · Ts | 0.5 | 1.6 | 4.9 | 4.9 | 4.9 |
| | Smaller than or equal to 7680 · Ts | 0.5 | 0.5 | 4.9 | 4.9 | 4.9 |
| $K_{CSI\_ref}$ under uplink-downlink configuration 2 | Larger than 7680 · Ts | 0.5 | 1.6 | 3.8 | 3.8 | 4.9 |
| | Smaller than or equal to 7680 · Ts | 0.5 | 0.5 | 3.8 | 3.8 | 4.9 |
| $K_{CSI\_ref}$ under uplink-downlink configuration 3 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |
| $K_{CSI\_ref}$ under uplink-downlink configuration 4 | Larger than 7680 · Ts | 0.5 | 1.6 | 4.9 | 4.9 | 4.9 |
| | Smaller than or equal to 7680 · Ts | 0.5 | 0.5 | 4.9 | 4.9 | 4.9 |
| $K_{CSI\_ref}$ under uplink-downlink configuration 5 | Larger than 7680 · Ts | 0.5 | 1.6 | 3.8 | 3.8 | 4.9 |
| | Smaller than or equal to 7680 · Ts | 0.5 | 0.5 | 3.8 | 3.8 | 4.9 |
| $K_{CSI\_ref}$ under uplink-downlink configuration 6 | Larger than 7680 · Ts | 0.5 | 1.6 | 0.5 | 0.5 | 0.5 |
| | Smaller than or equal to 7680 · Ts | 0.5 | 0.5 | 0.5 | 0.5 | 0.5 |

An embodiment of time-frequency resource indication of a CSI reference resource under one FDD:

It is assumed that the configuration of the periodic value and the subframe offset value of the periodic CSI reference resource, predefined by the network side and the user equipment, is the same as the above-mentioned "configuration embodiment of the periodic value and the subframe offset value of the periodic CSI reference resource". The network side notifies a configuration serial number $I_{CSI\_ref}=7$ corresponding to the periodic value and the subframe offset value of the periodic CSI reference resource in one carrier through high-level signalling. The user equipment receives the configuration serial number, and obtains that the periodic value of the periodic CSI reference resource in the carrier is 10 ms and the subframe offset value is 1. The user equipment may calculate and obtains that the expected subframe serial number $K_{CSI\_ref}$ of the periodic CSI reference resource is equal to 1. It is assumed that the user equipment judges that the subframe 1 satisfies the time domain definition of the CSI reference resource, the user equipment obtains the frequency domain resource of the CSI reference resource through the frequency domain definition of the CSI reference resource, at this time, complete time-frequency resource information of the CSI reference resource under the carrier is obtained.

Embodiment 1 of time-frequency resource indication of the CSI reference resource under one TDD:

the mapping relationship between the expected time domain serial number and the expected subframe serial number of the periodic CSI reference resource predefined by the network side and the user equipment, is the same as the mapping relationship in the "embodiment 1 of the mapping relationship between the expected time domain serial number of the periodic CSI reference resource and the expected subframe serial number of the periodic CSI reference resource under the TDD", the current uplink-downlink configuration of the TDD system is configuration 2, and the DwPTS length is larger than 7680·Ts. The network side and the user equipment further predefine that the periodic value of the periodic CSI reference resource is 5 ms, and the network side notifies that the subframe offset value of the periodic CSI reference resource in one carrier is 2 through high-level signalling. The user equipment receives the subframe offset value and calculates and obtains the expected time domain serial numbers $D_{CSI\_ref}$ of the periodic CSI reference resource under the carrier being 2 and 7. The user equipment obtains that the expected subframe serial numbers of the periodic CSI reference resource are 0 and 5, by the mapping relationship between the expected time domain serial number of the periodic CSI reference resource and the expected subframe serial number of the periodic CSI reference resource. It is assumed that the user equipment judges that the subframe 0 satisfies the time domain definition of the CSI reference resource, the user equipment obtains the frequency domain resource of the CSI reference resource through the frequency domain definition of the CSI reference resource, at this time, complete time-frequency resource information of the CSI reference resource under the carrier is obtained.

Embodiment 2 of time-frequency resource indication of the CSI reference resource under one TDD:

the mapping relationship between the subframe offset value $\Delta_{CSI\_ref}$ and the subframe offset correction value $\Lambda(\Delta_{CSI\_ref})$ predefined by the network side and the user equipment, is the same as the mapping relationship in the "embodiment 1 of the mapping relationship between the subframe offset value and the subframe offset correction value $\Lambda(\Delta_{CSI\_ref})$ of different uplink-downlink configurations under the TDD", the current uplink-downlink configuration of the TDD system is configuration 1, and the DwPTS length is smaller than 7680·Ts, the network side and the user equipment further predefine that the periodic value of the periodic CSI reference resource is 5 ms, and the network side notifies that the subframe offset value of the periodic CSI reference resource in one carrier is 3 through high-level signalling. The user equipment obtains that the subframe offset correction value is −1 according to the mapping relationship, and calculates that the expected subframe serial numbers $K_{CSI\_ref}$ of the periodic CSI reference resource under the carrier are 4 and 9. It is assumed that the user equipment judges that the subframe 4 satisfies the time domain definition of the CSI reference resource, the user equipment obtains the frequency domain resource of the CSI reference resource through the frequency domain definition of the CSI reference resource, at this time, complete time-frequency resource information of the CSI reference resource under the carrier is obtained.

Embodiment 3 of time-frequency resource indication of the CSI reference resource under one TDD:

the mapping relationship between the subframe offset value $\Delta_{CSI\_ref}$ and the expected subframe serial number $K_{CSI\_ref}$ of the periodic CSI reference resource predefined by the network side and the user equipment, is the same as the mapping relationship in the "embodiment 3 of the mapping relationship between the subframe offset value of different uplink-downlink configurations and the expected subframe serial number of the periodic CSI reference resource under the TDD", the current uplink-downlink configuration of the TDD system is configuration 5, and the DwPTS length is smaller than 7680·Ts, the network side and the user equipment further predefine that the periodic value of the periodic CSI reference resource is 5 ms, and the network side notifies that the subframe offset value of the periodic CSI reference resource in one carrier is 1 through high-level signalling. The user equipment obtains that the expected subframe serial numbers of the periodic CSI reference resource are 0 and 5. It is assumed that the user equipment judges that the subframe 5 satisfies the time domain definition of the CSI reference resource, the user equipment obtains the frequency domain resource of the CSI reference resource through the frequency domain definition of the CSI reference resource, at this time, complete time-frequency resource information of the CSI reference resource under the carrier is obtained.

Figure 5:
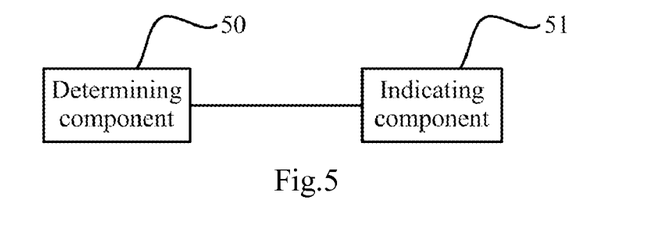
FIG. 5 is a schematic diagram of a structure of a base station provided by an embodiment of the present disclosure.

See FIG. 5, an embodiment of the present disclosure provides a base station, including:

a determining component 50, configured to determine a periodic value and/or a subframe offset value of a periodic CSI reference resource on a carrier for a terminal;

an indicating component 51, configured to indicate the determined periodic value and/or subframe offset value of the periodic CSI reference resource to the terminal.

Further, the determining component 50 is configured to:

for all carriers configured for the terminal, determine one periodic value and one subframe offset value of the periodic CSI reference resource;

the indicating component 51 is configured to:

indicate the determined periodic value and subframe offset value to the terminal through high-level signalling.

Further, the determining component 50 is configured to:

for each carrier configured for the terminal, respectively determine one periodic value and one subframe offset value of the periodic CSI reference resource;

the indicating component 51 is configured to:

indicate the determined periodic value and subframe offset value corresponding to each carrier to the terminal through high-level signalling.

Further, the determining component 50 is configured to:

for all carriers configured for the terminal, enable the network side to determine one subframe offset value of the periodic CSI reference resource;

the indicating component 51 is configured to:

indicate the determined subframe offset value to the terminal through high-level signalling.

Further, the determining component 50 is configured to:

for each carrier configured for the terminal, respectively determine one subframe offset value of the periodic CSI reference resource;

the indicating component 51 is configured to:

enable the network side to indicate the determined subframe offset value corresponding to each carrier to the terminal through high-level signalling.

An embodiment of the present disclosure provides a base station, including a processor and a data receiving and sending interface, wherein:

the processor is configured to determine a periodic value and/or a subframe offset value of a periodic CSI reference resource on a carrier for a terminal; indicate the determined periodic value and/or subframe offset value of the periodic CSI reference resource to the terminal;

the data receiving and sending interface is configured to achieve data communication with the terminal.

Figure 6:
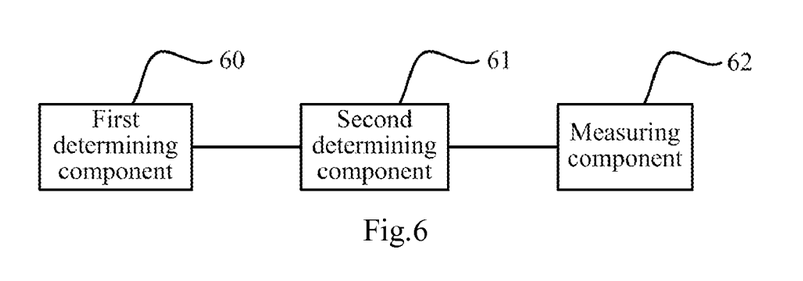
FIG. 6 is a schematic diagram of a structure of a terminal provided by an embodiment of the present disclosure.

See FIG. 6, an embodiment of the present disclosure provides a terminal, including:

a first determining component 60, configured to determine a periodic value and a subframe offset value of a periodic CSI reference resource on a carrier;

a second determining component 61, configured to determine a time-frequency resource corresponding to an effective CSI reference resource according to the frame structure type of the carrier and the determined periodic value and subframe offset value of the periodic CSI reference resource;

a measuring component 62, configured to measure the CSI on the determined time-frequency resource.

Further, the first determining component 60 is configured to:

determine the periodic value and the subframe offset value of the periodic CSI reference resource on the carrier according to the indication of a network side; or, determine the subframe offset value of the periodic CSI reference resource according to the indication of the network side, and determine the periodic value of the periodic CSI reference resource according to the negotiation with the network side; or, determine the periodic value of the periodic CSI reference resource according to the indication of the network side, and determine the subframe offset value of the periodic CSI reference resource according to the negotiation with the network side; or, determine the periodic value of the periodic CSI reference resource according to the previous negotiation with the network side, and determine the subframe offset value of the periodic CSI reference resource, according to the offset of an Interference Measurement Resource (IMR) or a Non-Zero Power Channel State Information Reference Signal NZP CSI-RS or a Zero Power Channel State Information Reference Signal (ZP CSI-RS).

Further, the second determining component 61 is configured to:

determine one or multiple expected subframe serial numbers $K_{CSI\_ref}$ corresponding to the periodic value and the subframe offset value of the periodic CSI reference resource, in the frame structure type of the carrier;

for each obtained expected subframe serial number $K_{CSI\_ref}$, determine whether the expected subframe serial number $K_{CSI\_ref}$ satisfies the time domain definition of a CSI reference resource in a long term evolution LTE system, if the expected subframe serial number $K_{CSI\_ref}$ satisfies the time domain definition of a CSI reference resource in a long term evolution LTE system, determine a unique subframe corresponding to the expected subframe serial number $K_{CSI\_ref}$ as the time domain resource corresponding to the effective CSI reference resource;

determine the frequency domain resource corresponding to the effective CSI reference resource, according to the frequency domain definition of the CSI reference resource in the LTE system.

Further, the second determining component 61 is configured to: determine one or multiple expected subframe serial numbers $K_{CSI\_ref}$ corresponding to the periodic value and the subframe offset value of the periodic CSI reference resource, in the frame structure type of the carrier according to the following method:

when the frame structure type of the carrier is the frame structure type 1 defined in the LTE system, the terminal obtains one or multiple expected subframe serial numbers $K_{CSI\_ref}$ of the periodic CSI reference resource satisfying the following formula 1:

$(10 \cdot n_f + K_{CSI\_ref} - \Delta_{CSI\_ref}) \bmod T_{CSI\_ref} = 0, K_{CSI\_ref} \in \{0,1,\ldots,9\}$;   formula 1:

herein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame.

Further, the second determining component 61 is configured to: determine one or multiple expected subframe serial numbers $K_{CSI\_ref}$ corresponding to the periodic value and the subframe offset value of the periodic CSI reference resource, in the frame structure type of the carrier according to the following method:

when the frame structure type of the carrier is the frame structure type 2 defined in the LTE system, the terminal obtains one or multiple expected time domain serial numbers $D_{CSI\_ref}$ of the periodic CSI reference resource satisfying the following formula 2:

$(10 \cdot n_f + D_{CSI\_ref} - \Delta_{CSI\_ref}) \bmod T_{CSI\_ref} = 0, D_{CSI\_ref} \in \{0,1,\ldots,9\}$;   formula 2:

herein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame;

for each obtained expected time domain serial number $D_{CSI\_ref}$, mapping according to a preset mapping method to obtain an expected subframe serial number $K_{CSI\_ref}$.

Further, for one expected time domain serial number $D_{CSI\_ref}$, the method of the second determining component 61 for mapping according to the preset mapping method to obtain an expected subframe serial number $K_{CSI\_ref}$ includes:

utilizing the expected time domain serial number $D_{CSI\_ref}$ as the expected subframe serial number $K_{CSI\_ref}$; or, determining whether a subframe corresponding to the expected time domain serial number $D_{CSI\_ref}$ is a downlink subframe or a particular subframe with Downlink Pilot Time Slot (DwPTS) domain length satisfying the time domain condition of the effective CSI reference resource, according to the current uplink-downlink configuration. If a subframe corresponding to the expected time domain serial number $D_{CSI\_ref}$ is a downlink subframe or a particular subframe with downlink pilot time slot DwPTS domain length satisfying the time domain condition of the effective CSI reference resource, utilizing the expected time domain serial number $D_{CSI\_ref}$ as the expected subframe serial number $K_{CSI\_ref}$; if the subframe corresponding to the expected time domain serial number $D_{CSI\_ref}$ is neither a downlink subframe, nor a particular subframe with DwPTS domain length satisfying the time domain condition of the effective CSI reference resource, utilizing the serial number of the downlink subframe, which is closest to the subframe denoted by the expected time domain serial number $D_{CSI\_ref}$, and is in front of the subframe denoted by the expected time domain serial number $D_{CSI\_ref}$ on timing sequence under the current uplink-downlink configuration, or utilizing the serial number of the particular subframe with the DwPTS domain length satisfying the time domain condition of the effective CSI reference resource as the expected subframe serial number $K_{CSI\_ref}$; or, obtaining an expected subframe serial number $K_{CSI\_ref}$ according to a mapping relationship between the expected time domain serial number and the expected subframe serial number of the periodic CSI reference resource pre-agreed with the network side.

Further, the second determining component 61 is configured to: determine one or multiple expected subframe serial numbers $K_{CSI\_ref}$ corresponding to the periodic value and the subframe offset value of the periodic CSI reference resource, in the frame structure type of the carrier according to the following method:

when the frame structure type of the carrier is the frame structure type 2 defined in the LTE system, the terminal obtains one or multiple expected subframe serial numbers $K_{CSI\_ref}$ of the periodic CSI reference resource satisfying the following formula 3:

$$(10 \cdot n_f + K_{CSI\_ref} - \Delta_{CSI\_ref} + \Lambda(\Delta_{CSI\_ref})) \bmod T_{CSI\_ref} = 0, K_{CSI\_ref} \in \{0,1,\ldots,9\}; \quad \text{formula 3:}$$

herein, $T_{CSI\_ref}$ refers to the determined periodic value of the periodic CSI reference resource, $\Delta_{CSI\_ref}$ refers to the determined subframe offset value of the periodic CSI reference resource, $n_f$ refers to the serial number of a radio frame, $\Lambda(\Delta_{CSI\_ref})$ refers to a subframe offset correction value of $\Delta_{CSI\_ref}$, the terminal obtains the $\Lambda(\Delta_{CSI\_ref})$ corresponding to the $\Delta_{CSI\_ref}$ according to a mapping relationship between the subframe offset value and the subframe offset correction value under the current uplink-downlink configuration pre-agreed with the network side.

Further, the second determining component 61 is configured to: determine one or multiple expected subframe serial numbers $K_{CSI\_ref}$ corresponding to the periodic value and the subframe offset value of the periodic CSI reference resource, in the frame structure type of the carrier according to the following method:

when the frame structure type of the carrier is the frame structure type 2 defined in the LTE system, obtaining, by the terminal, one or multiple expected subframe serial numbers $K_{CSI\_ref}$, corresponding to the subframe offset value of the periodic CSI reference resource, according to a mapping relationship between the subframe offset value and the expected subframe serial number under the current uplink-downlink configuration pre-agreed with the network side.

See FIG. 6, the embodiment of the present disclosure provides a terminal, including a processor and a data receiving and sending interface, herein:

the processor is configured to determine a periodic value and a subframe offset value of a periodic CSI reference resource on a carrier; determine a time-frequency resource corresponding to an effective CSI reference resource, according to the frame structure type of the carrier and the determined periodic value and subframe offset value of the periodic CSI reference resource; measure the CSI on the determined time-frequency resource;

the data receiving and sending interface is configured to achieve communication with a network side, in order to determine the periodic value and/or the subframe offset value of the periodic CSI reference resource on the carrier.

To sum up, the beneficial effects of the present disclosure include:

in the solutions provided by embodiments of the present disclosure, the network side indicates the periodic value and/or the subframe offset value of the periodic CSI reference resource to the terminal, after determining the periodic value and the subframe offset value of the periodic CSI reference resource on the carrier, the terminal determines the time-frequency resource corresponding to the effective CSI reference resource according to the frame structure type of the carrier and the determined periodic value and subframe offset value of the periodic CSI reference resource, and measures the CSI on the determined time-frequency resource. Thus it can be seen that, in the solutions, the terminal may determine the time-frequency resource where CSI measurement is performed, according to the periodic value and the subframe offset value of the periodic CSI reference resource, such that the complexity requirements of measurement and calculation of the terminal may be effectively reduced.

The present disclosure is described with reference to a flowchart and/or a block diagram of the method, the device (system) and a computer program product according to the embodiments of the present disclosure. It should be understood that each flow and/or block in the flowchart and/or the block diagram and the combination of the flows and/or blocks in the flowchart and/or the block diagram may be implemented by computer program instructions. These computer program instructions may be provided to processors of an all-purpose computer, a special-purpose computer, an embedded processor or other programmable data processing devices to generate a machine, in order to generate an apparatus used for achieving appointed functions in one flow or multiple flows in the flowchart and/or one block or multiple blocks in the block diagram, by means of the instructions implemented by the processors of the computers or the other programmable data processing devices.

These computer program instructions may also be stored in a computer readable memory capable of guiding the computers or the other programmable data processing devices to work in a particular manner, in order to enable the instructions stored in the computer readable memory to generate a product including an instruction apparatus, and the instruction apparatus achieves the appointed functions in one flow or multiple flows in the flowchart and/or one block or multiple blocks in the block diagram.

These computer program instructions may also be loaded on the computers or the other programmable data processing devices to implement a series of operation steps on the computers or the other programmable data processing devices to generate processing achieved by the computers, such that the instructions implemented on the computers or the other programmable data processing devices provide operations used for achieving the appointed functions in one flow or multiple flows in the flowchart and/or one block or multiple blocks in the block diagram.

Although the preferred embodiments of the present disclosure have been described, those skilled in the art may make additional changes and modifications to these embodiments once mastering the basic inventive concept. Therefore, the appended claims are intended to be explained to include the preferred embodiments and all changes and modifications falling within the scope of the present disclosure.

Apparently, those skilled in the art may make various variations and modifications to the present disclosure without departing from the spirit and scope of the present disclosure. In this way, if these modifications and variations of the present disclosure belong to the scope of the claims of the present disclosure and the equivalent technology thereof, the present disclosure is also intended to include these modifications and variations.

The invention claimed is:

1. A Channel State Information, CSI, measurement method, comprising:
   determining, by a terminal, a periodic value and a subframe offset value of a periodic CSI reference resource on a carrier;

determining, by the terminal, a time-frequency resource corresponding to an effective CSI reference resource, according to the frame structure type of the carrier and the determined periodic value and subframe offset value of the periodic CSI reference resource, and measuring the CSI on the determined time-frequency resource;

wherein determining, by the terminal, a time-frequency resource corresponding to an effective CSI reference resource according to the frame structure type of the carrier and the determined periodic value and subframe offset value of the periodic CSI reference resource, comprises:

determining, by the terminal, one or multiple expected subframe serial numbers $K_{CSI\_ref}$ corresponding to the periodic value and the subframe offset value of the periodic CSI reference resource, in the frame structure type of the carrier;

for each obtained expected subframe serial number $K_{CSI\_ref}$, determining, by the terminal, whether the expected subframe serial number $K_{CSI\_ref}$ satisfies the time domain definition of a CSI reference resource in a Long Term Evolution, LTE, system, if the expected subframe serial number $K_{CSI\_ref}$ satisfies the time domain definition of a CSI reference resource in an LTE system, determining a unique subframe corresponding to the expected subframe serial number $K_{CSI\_ref}$ as the time domain resource corresponding to the effective CSI reference resource;

determining, by the terminal, a frequency domain resource corresponding to the effective CSI reference resource, according to the frequency domain definition of the CSI reference resource in the LTE system.

2. The method according to claim 1, wherein determining, by a terminal, a periodic value and a subframe offset value of a periodic CSI reference resource on a carrier, comprises:

determining, by the terminal, the periodic value and the subframe offset value of the periodic CSI reference resource on the carrier according to the indication of a network side; or, determining, by the terminal, the subframe offset value of the periodic CSI reference resource according to the indication of the network side, and determining the periodic value of the periodic CSI reference resource according to the negotiation with the network side; or, determining, by the terminal, the periodic value of the periodic CSI reference resource according to the indication of the network side, and determining the subframe offset value of the periodic CSI reference resource according to the negotiation with the network side; or, determining, by the terminal, the periodic value of the periodic CSI reference resource according to the previous negotiation with the network side, and determining the subframe offset value of the periodic CSI reference resource according to the offset of an interference measurement resource IMR or a non-zero power channel state information reference signal NZP CSI-RS or a zero power channel state information reference signal ZP CSI-RS.

3. The method according to claim 1, wherein determining, by the terminal, one or multiple expected subframe serial numbers $K_{CSI\_ref}$ corresponding to the periodic value and the subframe offset value of the periodic CSI reference resource, in the frame structure type of the carrier, comprises:

when the frame structure type of the carrier is the frame structure type 1 defined in the LTE system, obtaining, by the terminal, one or multiple expected subframe serial numbers $K_{CSI\_ref}$ of the periodic CSI reference resource satisfying the following formula 1:

$$(10 \cdot n_f + K_{CSI\_ref} - \Delta_{CSI\_ref}) \bmod T_{CSI\_ref} = 0, K_{CSI\_ref} \in \{0,1,\ldots,9\}; \quad \text{formula 1:}$$

wherein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame.

4. The method according to claim 1, wherein determining, by the terminal, one or multiple expected subframe serial numbers $K_{CSI\_ref}$ corresponding to the periodic value and the subframe offset value of the periodic CSI reference resource, in the frame structure type of the carrier, comprises:

when the frame structure type of the carrier is the frame structure type 2 defined in the LTE system, obtaining, by the terminal, one or multiple expected time domain serial numbers $D_{CSI\_ref}$ of the periodic CSI reference resource satisfying the following formula 2:

$$(10 \cdot n_f + D_{CSI\_ref} - \Delta_{CSI\_ref}) \bmod T_{CSI\_ref} = 0, D_{CSI\_ref} \in \{0,1\ldots,9\}; \quad \text{formula 2:}$$

wherein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame;

for each obtained expected time domain serial number $D_{CSI\_ref}$, mapping, by the terminal, according to a preset mapping method to obtain an expected subframe serial number $K_{CSI\_ref}$.

5. The method according to claim 4, wherein the for each obtained expected time domain serial number $D_{CSI\_ref}$, mapping, by the terminal, according to a preset mapping method to obtain an expected subframe serial number $K_{CSI\_ref}$, comprises:

utilizing, by the terminal, the expected time domain serial number $D_{CSI\_ref}$ as the expected subframe serial number $K_{CSI\_ref}$; or, determining, by the terminal, whether a subframe corresponding to the expected time domain serial number $D_{CSI\_ref}$ is a downlink subframe or a particular subframe with Downlink Pilot Time Slot, DwPTS, domain length satisfying the time domain condition of the effective CSI reference resource, according to the current uplink-downlink configuration; if the subframe corresponding to the expected time domain serial number $D_{CSI\_ref}$ is a downlink subframe, or a particular subframe with DwPTS domain length satisfying the time domain condition of the effective CSI reference resource, utilizing the expected time domain serial number $D_{CSI\_ref}$ as the expected subframe serial number $K_{CSI\_ref}$; if the subframe corresponding to the expected time domain serial number $D_{CSI\_ref}$ is neither a downlink subframe, nor a particular subframe with DwPTS domain length satisfying the time domain condition of the effective CSI reference resource, utilizing the serial number of the downlink subframe, which is closest to the subframe denoted by the expected time domain serial number $D_{CSI\_ref}$ and is in front of the subframe denoted by the expected time domain serial number $D_{CSI\_ref}$ on timing sequence, under the current uplink-downlink configuration, or utilizing the serial number of the particular subframe with the DwPTS domain length satisfying the time domain condition of the effective CSI reference resource, as the expected subframe serial number $K_{CSI\_ref}$; or, obtaining, by the terminal, an expected subframe serial number $K_{CSI\_ref}$, according to a mapping relationship between the expected time domain serial number and the expected subframe serial number of the periodic CSI reference resource pre-agreed with the network side.

6. The method according to claim 1, wherein determining, by the terminal, one or multiple expected subframe serial numbers $K_{CSI\_ref}$ corresponding to the periodic value and the subframe offset value of the periodic CSI reference resource, in the frame structure type of the carrier, comprises:

when the frame structure type of the carrier is the frame structure type 2 defined in the LTE system, obtaining, by the terminal, one or multiple expected subframe serial numbers $K_{CSI\_ref}$ of the periodic CSI reference resource satisfying the following formula 3:

$$(10 \cdot n_f + K_{CSI\_ref} - \Delta_{CSI\_ref} + \Lambda\Delta_{CSI\_ref})) \bmod T_{CSI\_ref} = 0, K_{CSI\_ref} \in \{0,1,\ldots,9\}; \quad \text{formula 3:}$$

wherein, $T_{CSI\_ref}$ refers to the determined periodic value of the periodic CSI reference resource, $\Delta_{CSI\_ref}$ refers to the determined subframe offset value of the periodic CSI reference resource, of refers to the serial number of a radio frame, $\Lambda$ ($\Delta_{CSI\_ref}$) refers to a subframe offset correction value of $\Delta_{CSI\_ref}$, the terminal obtains the $\Lambda$ ($\Delta_{CSI\_ref}$) corresponding to the $\Delta_{CSI\_ref}$, according to a mapping relationship between the subframe offset value and the subframe offset correction value under the current uplink-downlink configuration pre-agreed with the network side.

7. The method according to claim 1, wherein determining, by the terminal, one or multiple expected subframe serial numbers $K_{CSI\_ref}$ corresponding to the periodic value and the subframe offset value of the periodic CSI reference resource, in the frame structure type of the carrier, comprises:

when the frame structure type of the carrier is the frame structure type 2 defined in the LTE system, obtaining, by the terminal, one or multiple expected subframe serial numbers $K_{CSI\_ref}$ corresponding to the subframe offset value of the periodic CSI reference resource, according to a mapping relationship between the subframe offset value and the expected subframe serial number under the current uplink-downlink configuration pre-agreed with the network side.

8. A terminal, comprising:
one or more processors; and
a memory, wherein:
the memory stores therein one or more computer readable program codes, and the processor or processors are configured to execute the one or more computer readable program codes to perform:
determining a periodic value and a subframe offset value of a periodic CSI reference resource on a carrier;
determining a time-frequency resource corresponding to an effective CSI reference resource according to the frame structure type of the carrier and the determined periodic value and subframe offset value of the periodic CSI reference resource;
measuring the CSI on the determined time-frequency resource;
wherein the one or more processors are configured to execute the one or more computer readable program codes to perform:

determining one or multiple expected subframe serial numbers $K_{CSI\_ref}$ corresponding to the periodic value and the subframe offset value of the periodic CSI reference resource, in the frame structure type of the carrier;

for each obtained expected subframe serial number $K_{CSI\_ref}$, determining whether the expected subframe serial number $K_{CSI\_ref}$ satisfies the time domain definition of a CSI reference resource in a long term evolution LTE system, if the expected subframe serial number $K_{CSI\_ref}$ satisfies the time domain definition of a CSI reference resource in a long term evolution LTE system, determining a unique subframe corresponding to the expected subframe serial number $K_{CSI\_ref}$ as the time domain resource corresponding to the effective CSI reference resource;

determining the frequency domain resource corresponding to the effective CSI reference resource, according to the frequency domain definition of the CSI reference resource in the LTE system.

9. The terminal according to claim 8, wherein the one or more processors are configured to execute the one or more computer readable program codes to perform:

determining the periodic value and the subframe offset value of the periodic CSI reference resource on the carrier according to the indication of a network side; or, determining the subframe offset value of the periodic CSI reference resource according to the indication of the network side, and determining the periodic value of the periodic CSI reference resource according to the negotiation with the network side; or, determining the periodic value of the periodic CSI reference resource according to the indication of the network side, and determining the subframe offset value of the periodic CSI reference resource according to the negotiation with the network side; or, determining the periodic value of the periodic CSI reference resource according to the previous negotiation with the network side, and determining the subframe offset value of the periodic CSI reference resource according to the offset of an Interference Measurement Resource, IMR, or a Non-Zero Power Channel State Information Reference Signal, NZP CSI-RS, or a Zero Power Channel State Information Reference Signal, ZP CSI-RS.

10. The terminal according to claim 8, wherein the one or more processors are configured to execute the one or more computer readable program codes to perform:

when the frame structure type of the carrier is the frame structure type 1 defined in the LTE system, enabling the terminal to obtain one or multiple expected subframe serial numbers $K_{CSI\_ref}$ of the periodic CSI reference resource satisfying the following formula 1:

$$(10 \cdot n_f + K_{CSI\_ref} - \Delta_{CSI\_ref}) \bmod T_{CSI\_ref} = 0, K_{CSI\_ref} \in \{0,1,\ldots,9\}; \quad \text{formula 1:}$$

wherein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame.

11. The terminal according to claim 8, wherein the one or more processors are configured to execute the one or more computer readable program codes to perform:

when the frame structure type of the carrier is the frame structure type 2 defined in the LTE system, enabling the terminal to obtain one or multiple expected time domain serial numbers $D_{CSI\_ref}$ of the periodic CSI reference resource satisfying the following formula 2:

$$(10 \cdot n_f + D_{CSI\_ref} - \Delta_{CSI\_ref}) \bmod T_{CSI\_ref} = 0, D_{CSI\_ref} \in \{0,1,\ldots,9\}; \quad \text{formula 2:}$$

wherein, $T_{CSI\_ref}$ refers to the determined periodic value of the periodic CSI reference resource, $\Delta_{CSI\_ref}$ refers to the determined subframe offset value of the periodic CSI reference resource, and $n_f$ refers to the serial number of a radio frame;

for each obtained expected time domain serial number $D_{CSI\_ref}$, mapping according to a preset mapping method to obtain an expected subframe serial number $K_{CSI\_ref}$.

12. The terminal according to claim 8, wherein the one or more processors are configured to execute the one or more computer readable program codes to perform:

when the frame structure type of the carrier is the frame structure type 2 defined in the LTE system, enabling the terminal to obtain one or multiple expected subframe serial numbers $K_{CSI\_ref}$ of the periodic CSI reference resource satisfying the following formula 3:

$$(10 \cdot n_f + K_{CSI\_ref} - \Delta_{CSI\_ref} + \Lambda(\Delta_{CSI\_ref})) \bmod T_{CSI\_ref} = 0, K_{CSI\_ref} \in \{0,1,\ldots,9\}; \quad \text{formula 3:}$$

wherein, $T_{CSI\_ref}$ refers to the determined periodic value of the periodic CSI reference resource, $\Delta_{CSI\_ref}$ refers to the determined subframe offset value of the periodic CSI reference resource, $n_f$ refers to the serial number of a radio frame, $\Lambda(\Delta_{CSI\_ref})$ refers to a subframe offset correction value of $\Delta_{CSI\_ref}$, enabling the terminal to obtain the $\Lambda(\Delta_{CSI\_ref})$ corresponding to the $\Delta_{CSI\_ref}$ according to a mapping relationship between the subframe offset value and the subframe offset correction value under the current uplink-downlink configuration pre-appointed with the network side.

13. The terminal according to claim 8, wherein the one or more processors are configured to execute the one or more computer readable program codes to perform:

when the frame structure type of the carrier is the frame structure type 2 defined in the LTE system, enabling the terminal to obtain one or multiple expected subframe serial numbers $K_{CSI\_ref}$ corresponding to the subframe offset value of the periodic CSI reference resource, according to a mapping relationship between the subframe offset value and the expected subframe serial number under the current uplink-downlink configuration pre-agreed with the network side.

* * * * *